US012776633B2

(12) United States Patent
Barnes

(10) Patent No.: US 12,776,633 B2
(45) Date of Patent: Oct. 27, 2026

(54) OVERHEAD LINE CLAMP

(71) Applicant: GRIPPLE LIMITED, Sheffield (GB)

(72) Inventor: Samuel Barnes, Sheffield (GB)

(73) Assignee: GRIPPLE LIMITED (GB)

( * ) Notice: Subject to any disclaimer, the term of this patent is extended or adjusted under 35 U.S.C. 154(b) by 156 days.

(21) Appl. No.: 18/717,890

(22) PCT Filed: Dec. 6, 2022

(86) PCT No.: PCT/IB2022/061806
§ 371 (c)(1),
(2) Date: Jun. 7, 2024

(87) PCT Pub. No.: WO2023/105396
PCT Pub. Date: Jun. 15, 2023

(65) Prior Publication Data

US 2025/0062603 A1 Feb. 20, 2025

(30) Foreign Application Priority Data

Dec. 10, 2021 (GB) ..................................... 2117893
Dec. 5, 2022 (GB) ..................................... 2218241

(51) Int. Cl.
*H02G 7/06* (2006.01)
*F16L 3/02* (2006.01)

(52) U.S. Cl.
CPC . *H02G 7/06* (2013.01); *F16L 3/02* (2013.01)

(58) Field of Classification Search
None
See application file for complete search history.

(56) References Cited

U.S. PATENT DOCUMENTS 1,461,752 A * 7/1923 Chandler ................. B60M 1/24 24/135 R
3,923,363 A * 12/1975 Kraft .................... H01R 4/2408 439/477
4,707,051 A * 11/1987 Hall ......................... H01R 4/44 439/781
5,692,930 A * 12/1997 Garver ................. H01R 4/5091 439/781
7,666,024 B2 * 2/2010 De France ............. H01R 11/15 439/479
10,649,169 B2 * 5/2020 Al Ghossein .......... G02B 6/483
10,795,108 B2 * 10/2020 Al Ghossein .......... G02B 6/483
(Continued)

FOREIGN PATENT DOCUMENTS

AU 2006100795 A4 10/2006
CN 213056777 U 4/2021
(Continued)

*Primary Examiner* — Krystal Robinson
(74) *Attorney, Agent, or Firm* — Clark Hill PLC; James R. Foley

(57) ABSTRACT

An overhead line clamp (100) securable to an overhead line (2), the overhead line clamp (100) comprising: pincer members (102); a hinge (104) to enable the pincer members (102) to actuate between an open position and a closed position, wherein at the closed position the pincer members (102) are configured to secure the overhead line (2); and a hand-operable latch (108) configured to actuate the pincer members (102) between the open position and the closed position.

19 Claims, 3 Drawing Sheets

(56) References Cited

U.S. PATENT DOCUMENTS

| | | | | |
|---|---|---|---|---|
| 2008/0194153 | A1* | 8/2008 | De France | H01R 4/4872 439/822 |
| 2012/0142231 | A1* | 6/2012 | De France | H01R 43/20 439/815 |
| 2015/0014050 | A1* | 1/2015 | Tufari | H02G 7/125 174/40 CC |
| 2018/0031794 | A1* | 2/2018 | Sakmar | H02G 1/04 |
| 2018/0031795 | A1* | 2/2018 | Al Ghossein | G02B 6/483 |
| 2024/0360922 | A1* | 10/2024 | Klos | F16L 3/137 |
| 2025/0102082 | A1* | 3/2025 | Kubik | F16L 3/11 |
| 2025/0287884 | A1* | 9/2025 | Grayson | A01G 9/128 |

FOREIGN PATENT DOCUMENTS

| | | | | |
|---|---|---|---|---|
| GB | 1306237 | A | 2/1973 | |
| GB | 2330241 | A | 4/1999 | |
| JP | 63171232 | A | 7/1988 | |
| JP | 63193936 | A | 8/1988 | |
| JP | 3824424 | B2 | 9/2006 | |
| WO | WO-2010012989 | A1 * | 2/2010 | F16G 11/106 |
| WO | 2020012989 | A1 | 1/2020 | |

* cited by examiner

OVERHEAD LINE CLAMP

FIELD OF THE INVENTION

Embodiments of the present invention relate to an overhead line clamp. In particular, but not exclusively, they relate to an overhead contact line clamp for an electrified overhead line system.

BACKGROUND TO THE INVENTION

An electrified overhead line system for transportation is also referred to as an overhead catenary system. The system comprises electrical cables configured to transmit electric energy to vehicles such as electric locomotives, trolleybuses, trams or even heavy goods road vehicles.

The vehicle comprises an overhead device such as a pantograph, bow collector or trolley pole to collect electrical energy from the overhead line system.

A common overhead line system comprises an upper line, a lower line (contact line), and periodically spaced droppers suspending the lower line from the upper line.

The upper end of each dropper is connected to the upper line by a clamp. The lower end of each dropper is connected to the lower line by a clamp. Each clamp forms a tight mechanical and electrical connection.

Existing clamp designs are time-consuming to fasten, especially if the clamp needs to be loosened and slightly repositioned multiple times to set the correct vertical height of the contact line.

BRIEF DESCRIPTION OF VARIOUS EMBODIMENTS OF THE INVENTION

According to an aspect of the invention there is provided an overhead contact line clamp configured to secure a dropper to an overhead contact line, the overhead contact line clamp comprising:

a dropper connector to secure the clamp to the dropper;

pincer members each shaped to fit within a corresponding side groove of the overhead contact line when the pincer members are at a closed position;

a hinge to enable the pincer members to actuate between an open position and the closed position; and a hand-operable latch configured to actuate the pincer members between the open position and the closed position.

The hand-operable latch provides the advantage of enabling rapid securing of a dropper to an overhead contact line, and for rapid adjustment of the clamp position to correct the verticality of the dropper. This is because the hand-operable latch obviates the requirement for tools.

The hand-operable latch may comprise a hand-operable lever. A stroke length of the hand-operable lever may be configured wherein when the hand-operable lever is at one end of its stroke, the pincer members are at the open position spaced far enough apart to receive the side grooves of the overhead contact line therebetween, and when the hand-operable lever is at a second end of its stroke, the pincer members are at the closed position to clamp against the side grooves.

An advantage is further increasing the speed at which the dropper can be secured to the overhead contact line.

The hand-operable lever may have a mechanical advantage of greater than two, for example. However, a mechanical advantage of the hand-operable lever of more than three or more than four may further reduce effort required for single-stroke operation as described above, while enabling the use of a durable stiff hinge (e.g., metal living hinge as described below). The length of the hand-operable lever may be at least as long as, or longer than the length of a pincer member.

The hand-operable latch may be a bistable latch mechanism. For example, the hand-operable latch may be an over-centre latch. The over-centre latch may comprise the hand-operable lever configured to rotate a cam to actuate the pincer members.

An advantage is that toggle-like feedback is provided to the user, indicating that the pincer members are at the closed position. This obviates the need for a torque specification for the user to manually check and adhere to.

The latch may comprise a stud interconnecting the pincer members, one end of the stud anchored to the latch, the latch configured to thrust against a first one of the pincer members, and the other end of the stud anchored to a second one of the pincer members opposite the first pincer member.

Alternatively, the hand-operable latch may be of a different type than an over-centre latch.

The hand-operable latch may further comprise a catch that is engageable when the pincer members are actuated at the closed position to inhibit movement of the pincer members away from the closed position.

An advantage is that the latch is resistant against being worked loose, for example as a result of noise, vibration and harshness of passing vehicles, or wind-induced oscillation of the line, among other things.

The clamp may comprise electrically conductive material to form an electrical connection between the dropper connector and the pincer members. The electrically conductive material may comprise copper, silver, tin, aluminium, or an alloy thereof.

The hinge may be a living hinge. The hinge may comprise the electrically conductive material. The hinge may be unitary with the pincer members.

An advantage is that a single moulded body of electrically conductive material can be used.

The hinge may comprise the dropper connector. The dropper connector may comprise a socket to receive the dropper.

The socket may be located at the hinge, so that as the pincer members move to the closed position, deformation of the hinge compresses the socket to secure the clamp to the dropper.

An advantage is that the same user hand-actuation secures the clamp to both the overhead contact line and to the dropper. A further advantage is that electrical conductivity is maintained in use during any vibrations through the clamp.

According to a further aspect of the invention there is provided a system comprising the overhead contact line clamp, the overhead contact line, and the dropper.

According to a further aspect of the invention there is provided an overhead line clamp securable to an overhead line, the overhead line clamp comprising:

pincer members;

a hinge to enable the pincer members to actuate between an open position and a closed position, wherein at the closed position the pincer members are configured to secure the overhead line; and a hand-operable latch configured to actuate the pincer members between the open position and the closed position.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
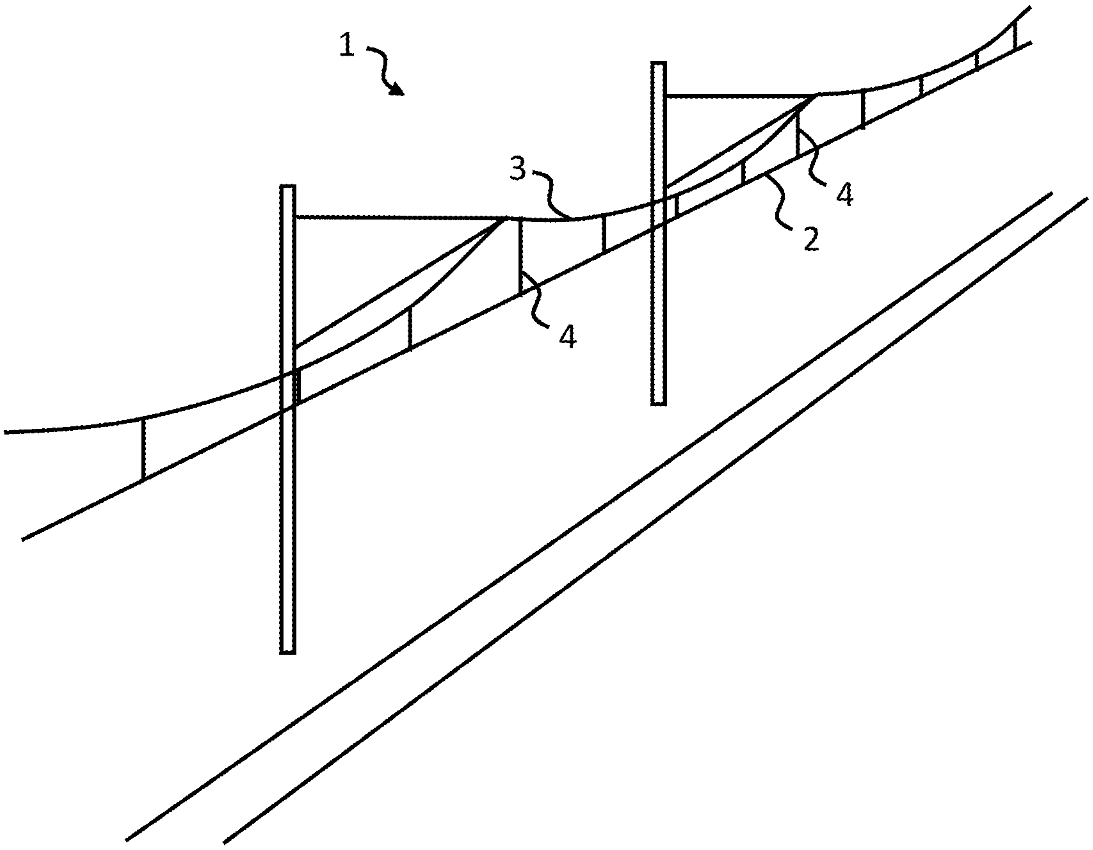
FIG. 1 illustrates an example of an overhead line system.

FIG. 1 illustrates an example electrified overhead line system 1 for transportation. The overhead line system 1 comprises: an upper, catenary line 3; a lower, contact line 2; and periodically spaced droppers 4 suspending the contact line 2 from the catenary line 3.

The contact line 2 is an electrically conductive line configured to contact the overhead device of the vehicle, forming an electrical connection. The contact line 2 is suspended at a substantially constant vertical height above the rails/roadway, to maintain constant contact with an overhead device of the vehicle such as a pantograph, bow collector or trolley pole.

The catenary line 3 is an electrically conductive line attached at intervals to support structures such as masts or buildings. The catenary line 3 extends parallel to and above the contact line 2. The catenary line 3 droops at each mid-span, due to its own weight and the weight of the droppers 4 and contact line 2 suspended therefrom.

The droppers 4 are upright electrically conductive lines, such as generally vertical wires, for hanging the contact line 2 from the catenary line 3. Droppers 4 which are connected to the mid-spans of the catenary line 3 are typically shorter than those connected towards the end spans of the catenary line 3, to compensate for the droop of the catenary line 3 and ensure that the contact line 2 is a constant height.

The illustrated example system 1 is suitable for a heavy-rail implementation, over a permanent way. However, the clamp of the present invention is also useable in other types of overhead line systems, such as a light rail/tram electrified overhead line system. The latter system may have spaced support lines perpendicular to the contact line 2, which connect to the contact line 2 directly or via a short dropper 4.

Figure 2:
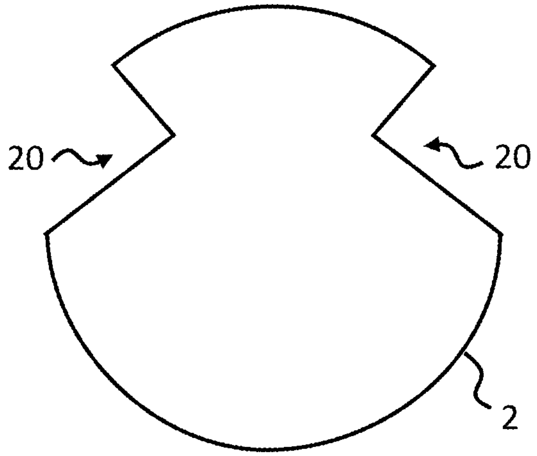
FIG. 2 illustrates an example of an overhead contact line.

FIG. 2 illustrates an example of a cross-section of a contact line 2. Without limitation, the contact line 2 may be a single-core wire such as a cold drawn solid wire made of copper, silver, tin, or an alloy thereof.

The contact line 2 has a non-circular cross-section. The contact line 2 has side grooves 20 at its left and right sides. The side grooves 20 provide a clamping surface for clamps, enabling an interference clamping fit in which pincer members slot into the side grooves 20 and laterally compress the contact line 2. The exact dimensions of the contact line 2 may be standardised, but may differ globally depending on the railway standard applicable to the region.

Figure 3:
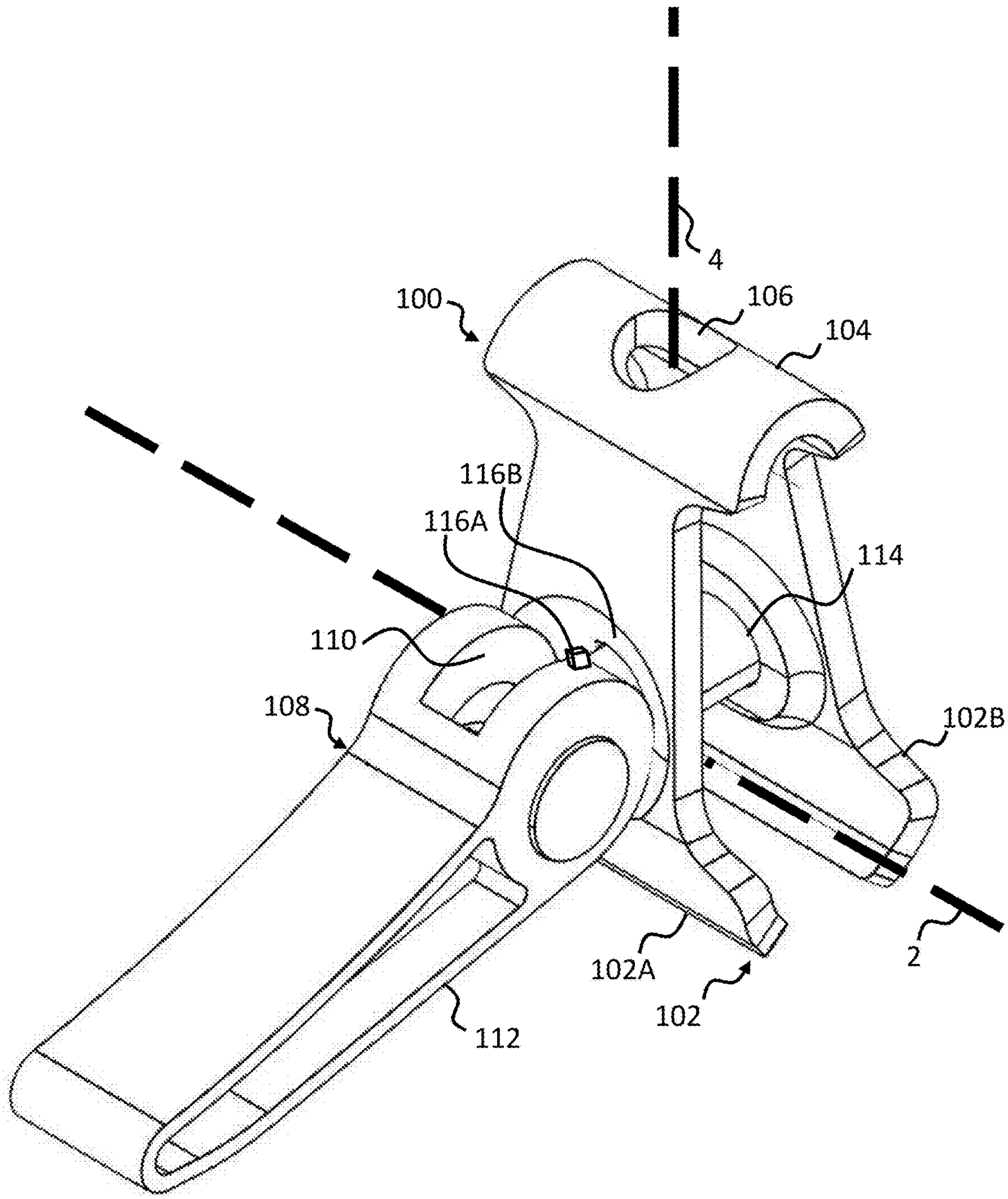
FIG. 3 illustrates an example of an overhead contact line clamp.

FIG. 3 illustrates an example implementation of an overhead contact line clamp 100 according to various embodiments of the present invention. The clamp 100 is configured to clamp onto a contact line 2 of the geometry governed by relevant standards, such as the contact line 2 schematically shown in FIG. 2.

The clamp 100 comprises pincer members 102 each shaped to fit within a corresponding side groove of the overhead contact line 2 when the pincer members 102 are at a closed position.

At the closed position, the tips of the pincer members 102 may be spaced from each other by a value selected from the range at least 5.5 millimetres to less than eight millimetres, such as approximately six millimetres. This enables the pincer members 102 to fit into the grooves 20, with interference preventing at least a European-style contact line 2 from falling out.

At the open position, the tips of the pincer members 102 may be spaced from each other by greater than eight millimetres. This is wide enough to receive at least the top part of a contact line 2.

The clamp 100 comprises a dropper connector 106 to secure the clamp 100 to a dropper 4. The illustrated dropper connector 106 comprises a socket to receive the dropper 4. The socket is shown as a through-hole, through which an end (e.g., crimped end) of the dropper 4 can be inserted and then clamped by deformation of the socket to anchor the end of the dropper 4 to the clamp 100.

It would be appreciated that another type of dropper connector 106 could be used, in other implementations.

The clamp 100 may comprise a unitary body of electrically conductive material. The body may integrally combine the pincer members 102 and the dropper connector 106.

The electrically conductive material forms an electrical connection between the dropper connector 106 and the pincer members 102. This enables electrical power to be transferred from a dropper 4 to a contact line 2.

Figure 4:
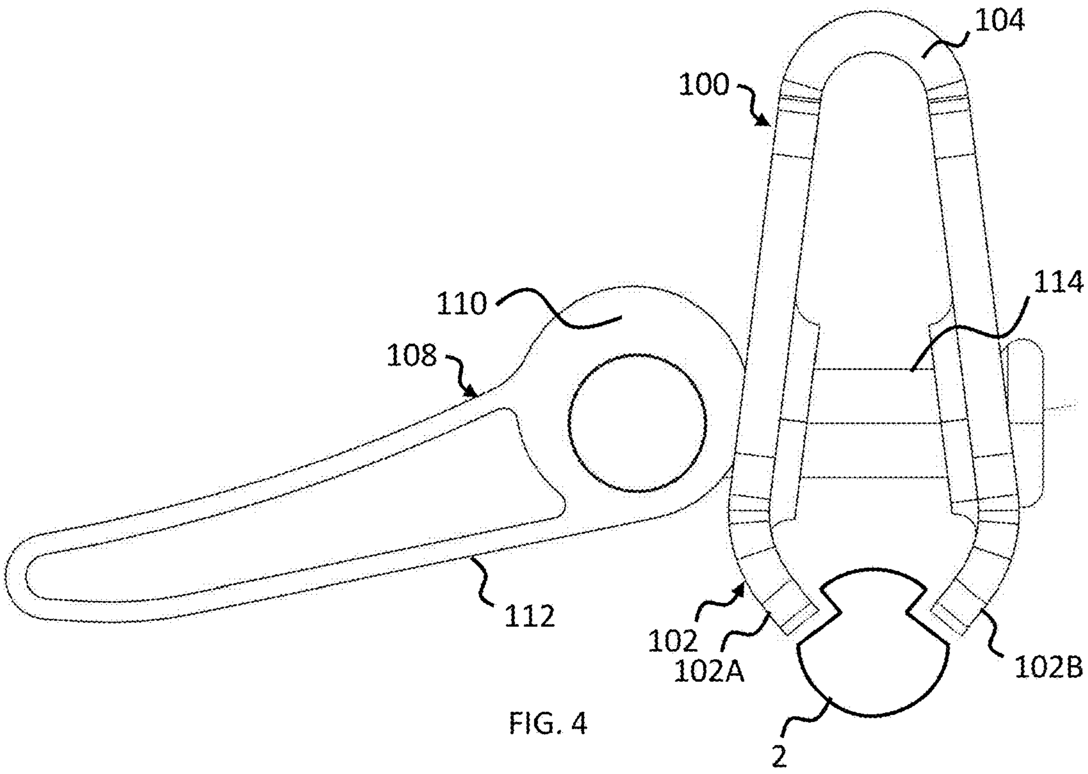
FIG. 4 illustrates the overhead contact line clamp with a cam lever in an open position.
Figure 5:
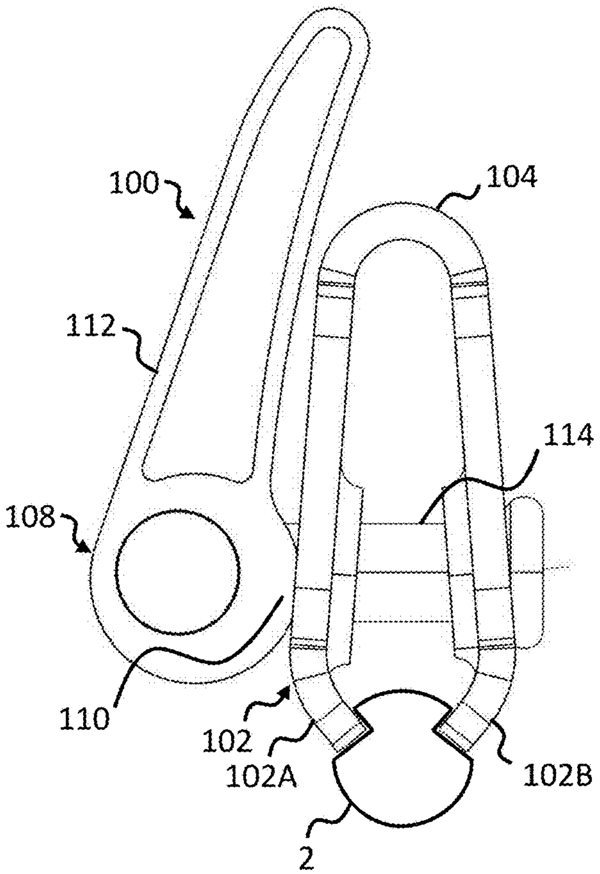
FIG. 5 illustrates the overhead contact line clamp with the cam lever in a closed position.

The clamp 100 further comprises a hinge 104 to enable the pincer members 102 to actuate between an open position, shown in FIG. 4, and a closed position, shown in FIG. 5. The hinge axis of the hinge 104 is substantially parallel to the axis of the contact line 2.

In the illustrated example, the hinge 104 is a living hinge consisting of the same electrically conductive material as described above. The inherent flexibility of copper means that the living hinge 104 does not necessarily need to be weaker/less geometrically stiff than the pincer members 102.

The dropper connector 106 may be located at the hinge 104 between the pincer members 102. The dropper connector 106 may be vertically oriented and perpendicular to the hinge axis of the hinge 104. The dropper connector 106 may be a hole in the electrically conductive material. The dropper connector 106 may be dimensioned for a given dropper cross-section. For example, the dropper connector 106 may have a hole diameter of greater than approximately five millimetres. By locating the dropper connector 106 at the hinge 104, the action of actuating the pincer members 102 to the closed position deforms the hinge 104 sufficiently for the dropper connector 106 to compress and squeeze the sides of the end (e.g., crimped end) of the dropper 4.

FIGS. 3-5 further illustrate a hand-operable over-centre latch 108 in the form of a cam lever comprising a cam 110 and a hand-operable lever 112. The term 'cam' is understood to cover both lobed cam mechanisms and eccentric mechanisms.

The latch 108 has a latch-open position, as shown in FIG. 4, at which the pincer members 102 are at the open position. The latch 108 has a latch-closed position, as shown in FIG. 5, at which the pincer members 102 are at the closed position. The latch 108 exhibits bistability, toggling between stable positions as it is moved 'over-centre' of the cam 110.

The lever 112 is hand-operable, having a mechanical advantage of greater than two or greater than three or greater than four, to enable an adult human hand to elastically deform the hinge 104 (e.g., copper living hinge), via the cam lever 112, until the cam 110 reaches an over-centre position (maximum lift).

The lever 112 may be able to travel at least a short distance past the over-centre position (maximum lift of the cam 110), to settle in a stable latch-closed position.

The latch 108 comprises a stud 114 interconnecting the pincer members 102. One end of the stud 114 is anchored to the latch 108. The cam 110 is configured to thrust against a first one of the pincer members 102A. The stud 114 extends through the first pincer member. The other end of the stud 114 is anchored to a second pincer member 102B opposite the first pincer member 102A.

A stroke length of the lever 112 is such that when the lever 112 is at one end of its stroke (FIG. 4), the pincer members 102 are at the open position spaced far enough apart to receive the side grooves 20 of the overhead contact line 2 therebetween. When the lever 112 is at a second end of its stroke (FIG. 5), the pincer members 102 are at the closed position to clamp against the side grooves 20 of the overhead contact line 2. The stroke of the lever 112 may be a value greater than 60 degrees or greater than 100 degrees, such as approximately 120 degrees.

The illustrated lever 112 is long enough for the tip of the lever 112 to protrude above the top of the hinge 104, when at the second end of its stroke (FIG. 5) corresponding to the latch-closed position. The lever 112 may be at least as long as, or slightly longer than the length of a pincer member 102. In FIG. 5, the lever 112 at the second end of its stroke may be substantially parallel to the first pincer member 102A.

FIG. 3 schematically illustrates an example catch 116A that is engageable when the pincer members are actuated at the closed position to inhibit movement of the pincer members away from the closed position.

The illustrated catch 116A comprises a tooth on the cam 110 that is configured to engage with a tooth-receiving surface formation 116B (e.g., stud hole) on the side of the first pincer member 102A when the cam 110 has rotated over-centre towards the latch-closed position of the lever 112. The tooth and the tooth-receiving surface formation may be shaped to create a ratchet force inhibiting backwards rotation of the lever 112.

Therefore, as illustrated, the catch 116A may be configured to engage automatically as the lever 112 reaches the latch-closed position. Further, the catch 116A is configured such that more force is required to move the lever 112 from the latch-closed position to the latch-open position than to move the lever 112 from the latch-open position to the latch-closed position.

It would be appreciated that the catch 116A is not limited to the specific example shown. For example, an alternative (or additional) type of catch can comprise a side slot towards a distal end of the lever 112. When the lever 112 reaches the latch-closed position, the side slot of the lever 112 may be coaxially aligned above the dropper connector 106. Therefore, the dropper 4 can be slid into the side slot of the end of the lever 112. This means that the lever 112 cannot be moved out of the latch-closed position without first laterally sliding out the dropper 4 from the side slot.

In other examples, the hand-operable latch 108 may be of a different type than an over-centre latch. Examples include, but are not limited to:

- a hand-operable crank such as a threaded screw with a hand-operable crank lever at one end;
- a rotary button clamp such as a quarter-turn clamp, a half-turn clamp or a full-turn clamp;
- a scissor mechanism clamp or other push-pull clamp.

Some example embodiments involving cranking can comprise a torque limiter, to automatically prevent over-torquing. A torque limiter can be a clutch-based torque-limiter, or another type of torque limiter. A clutch-based torque limiter can comprise a pawl clutch or a ball detent clutch, or another suitable type of clutch. Such clutches can further be adapted to prevent reverse movement of the hand-operable latch, for example by making ball detent surfaces shallower in the reverse direction to reduce the torque at which the balls pop out of the detents.

Although embodiments of the present invention have been described in the preceding paragraphs with reference to various examples, it should be appreciated that modifications to the examples given can be made without departing from the scope of the invention as claimed. For example, the clamp could be used for the upper end of a dropper, to connect to the catenary line Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An overhead line clamp securable to an overhead line, in the form of an overhead contact line clamp configured to secure a dropper to the overhead line in the form of an overhead contact line comprising side grooves, the overhead line clamp comprising:

- a dropper connector to secure the overhead contact line clamp to the dropper;
- pincer members;
- each shaped to fit within a corresponding one of the side grooves of the overhead contact line when the pincer members are at a closed position;
- a hinge to enable the pincer members to actuate between an open position and the closed position, wherein at the closed position the pincer members are configured to secure the overhead line; and
- a hand-operable latch configured to actuate the pincer members between the open position and the closed position.

2. The overhead line clamp of claim 1, wherein the hand-operable latch comprises a hand-operable lever.

3. The overhead line clamp of claim 1, wherein the hand-operable latch is a bistable latch mechanism.

4. The overhead line clamp of claim 1, wherein the hand-operable latch comprises a stud interconnecting the pincer members, one end of the stud anchored to the hand-operable latch, the hand-operable latch configured to thrust against a first one of the pincer members, and the other end of the stud anchored to a second one of the pincer members opposite the first pincer member.

5. The overhead line clamp of claim 1, wherein the hand-operable latch further comprises a catch that is engageable when the pincer members are actuated at the closed position to inhibit movement of the pincer members away from the closed position.

6. The overhead line clamp of claim 1, comprising electrically conductive material to form an electrical connection between a socket of the overhead line clamp and the pincer members.

7. The overhead contact line clamp of claim 1, wherein the hand-operable latch comprises a hand-operable lever, wherein a stroke length of the hand-operable lever is configured wherein when the hand-operable lever is at one end of a stroke, the pincer members are at the open position spaced far enough apart to receive the side grooves of the overhead contact line therebetween, and when the hand-operable lever is at a second end of the stroke, the pincer members are at the closed position to clamp against the side grooves.

8. The overhead contact line clamp of claim 7, wherein the hand-operable lever has a mechanical advantage of greater than two.

9. The overhead contact line clamp of claim 7, wherein the hand-operable latch is a bistable latch mechanism, and wherein the hand-operable latch is an over-centre latch.

10. The overhead contact line clamp of claim 9, wherein the hand-operable latch comprises a hand-operable lever, wherein the over-centre latch comprises the hand-operable lever configured to rotate a cam to actuate the pincer members.

11. The overhead contact line clamp of claim 10, wherein the hand-operable lever is configured to rotate the cam to actuate the pincer members to provide toggle feedback to the user, indicating that the pincer members are at the closed position.

12. The overhead contact line clamp of claim 7, wherein the hand-operable latch further comprises a catch that is engageable when the pincer members are actuated at the closed position to inhibit movement of the pincer members away from the closed position, wherein the catch comprises a slot towards a distal end of the hand-operable lever, wherein when the hand-operable lever reaches a latch-closed position, the slot of the hand-operable lever is coaxially aligned above the dropper connector.

13. The overhead contact line clamp of claim 1, wherein the hinge is a living hinge.

14. The overhead contact line clamp of claim 1, wherein the hinge comprises the dropper connector.

15. The overhead contact line clamp of claim 1, wherein the dropper connector comprises a socket to receive the dropper.

16. The overhead contact line clamp of claim 15, wherein the socket is located at the hinge, so that as the pincer members move to the closed position, deformation of the hinge compresses the socket to secure the overhead contact line clamp to the dropper.

17. The overhead contact line clamp of claim 16, comprising electrically conductive material to form an electrical connection between the dropper connector and the pincer members, wherein the hinge comprises the electrically conductive material.

18. The overhead contact line clamp of claim 17, wherein the hinge is unitary with the pincer members.

19. A system comprising the overhead contact line clamp of claim 1, the overhead contact line of claim 1, and the dropper of claim 1.

* * * * *